Dec. 7, 1954

C. D. BAILEY 2,696,379

COMPUTING SCALE

Filed July 7, 1947

Inventor

Curtis D. Bailey,

By John B. Brady
Attorney

Dec. 7, 1954  C. D. BAILEY  2,696,379
COMPUTING SCALE
Filed July 7, 1947  7 Sheets-Sheet 3

Inventor
Curtis D. Bailey,
By John B. Brady, Attorney

Dec. 7, 1954  C. D. BAILEY  2,696,379
COMPUTING SCALE
Filed July 7, 1947  7 Sheets-Sheet 4

INVENTOR.
Curtis D. Bailey,
BY
John B. Brady
ATTORNEY

Dec. 7, 1954 C. D. BAILEY 2,696,379
COMPUTING SCALE
Filed July 7, 1947 7 Sheets-Sheet 6

INVENTOR.
Curtis D. Bailey,
BY
John B. Brady
ATTORNEY.

United States Patent Office 2,696,379
Patented Dec. 7, 1954

2,696,379

COMPUTING SCALE

Curtis D. Bailey, North Kenova, Ohio

Application July 7, 1947, Serial No. 759,458

9 Claims. (Cl. 265—37)

My invention relates broadly to computing scales and more particularly to a direct reading scale for providing an immediate visual indication of the price of commodities of any weight at any predetermined price per pound.

One of the objects of my invention is to provide a practical construction of computing scale which will provide both customers and merchants with quick and accurate information of the price of commodities sold according to weight at predetermined price per pound.

Another object of my invention is to provide a construction of computing scale which will provide precise price per pound readings and which is of simple construction and capable of being manufactured at relatively low cost in mass production.

Still another object of my invention is to provide an improved construction for mounting and operating coordinate scales in a price per pound computing scale.

Still another object of my invention is to provide a construction of computing scale having a multiplicity of visual reading scales operated under control of a scale weighing platform in which a single counter-balance may be utilized in adjusting the weighing mechanism of the scale.

A further object of my invention is to provide an adjustable counter-balance mechanism for weighing scales into which oscillations of the reading scales are so damped that a direct reading of price per pound scales may be accurately read without appreciable oscillation of the scales.

Other and further objects of my invention reside in an improved construction for coordinating the weighing platform, weighing scale and scale drums of a computing scale as set forth more fully in the specification hereinafter following by reference to the accompanying drawings in which:

Fig. 3 is a horizontal fragmentary sectional view taken on line 3—3 of Fig. 1; Fig. 8 illustrates a further view similar to the views illustrated in Figs. 4 and 7 and showing another intermediate position of the adjusting mechanism; Fig. 13 is a front elevational view of the counter-weight and adjustable slide associated therewith; Fig. 14 is a vertical sectional view taken substantially on line 14—14 of Fig. 13; Fig. 15 is a rear elevational view of the adjustable slide and counter-weight illustrated in Figs. 13 and 14.

Referring to the drawings in detail reference character 1 designates the scale platform which is supported by posts adjacent the four opposite corners thereof shown at 2, 3, 4 and 5. The posts 2, 3, 4 and 5 are detachably engaged by bosses depending downwardly from the scale platform 1 and through apertures in the top of the scale casing 6 as represented at 7 and 8 in Fig. 1. The platform 1 is removable from the upper ends of posts 2, 3, 4 and 5 and serves to receive the commodities which are to be weighed. The posts 2 and 4 terminate in beams 9a and 9 respectively while the posts 3 and 5 terminate in beams 10a and 10 respectively. The beams are directed toward each other and are connected through steel ribbons 11 and 12 respectively which extend around cam members 14 and 15 fastened to the scale beams 16 and 17. The construction of the steel ribbons is shown more clearly in Figs. 9, 10 and 11 which include a tape portion represented at 11 terminating in cylindrical end portions represented at 11a' and 11b'. The steel end portions are brazed to the tape portion and serve as the engaging means between the cams 14 and 15 of scale beams 16 and 17 and beams 9 and 10. The scale beams 16 and 17 are fulcrumed in the side bearings 18 and 19 carried in the opposite side walls of the casing 6.

Figures 1, 9, 10, 11:
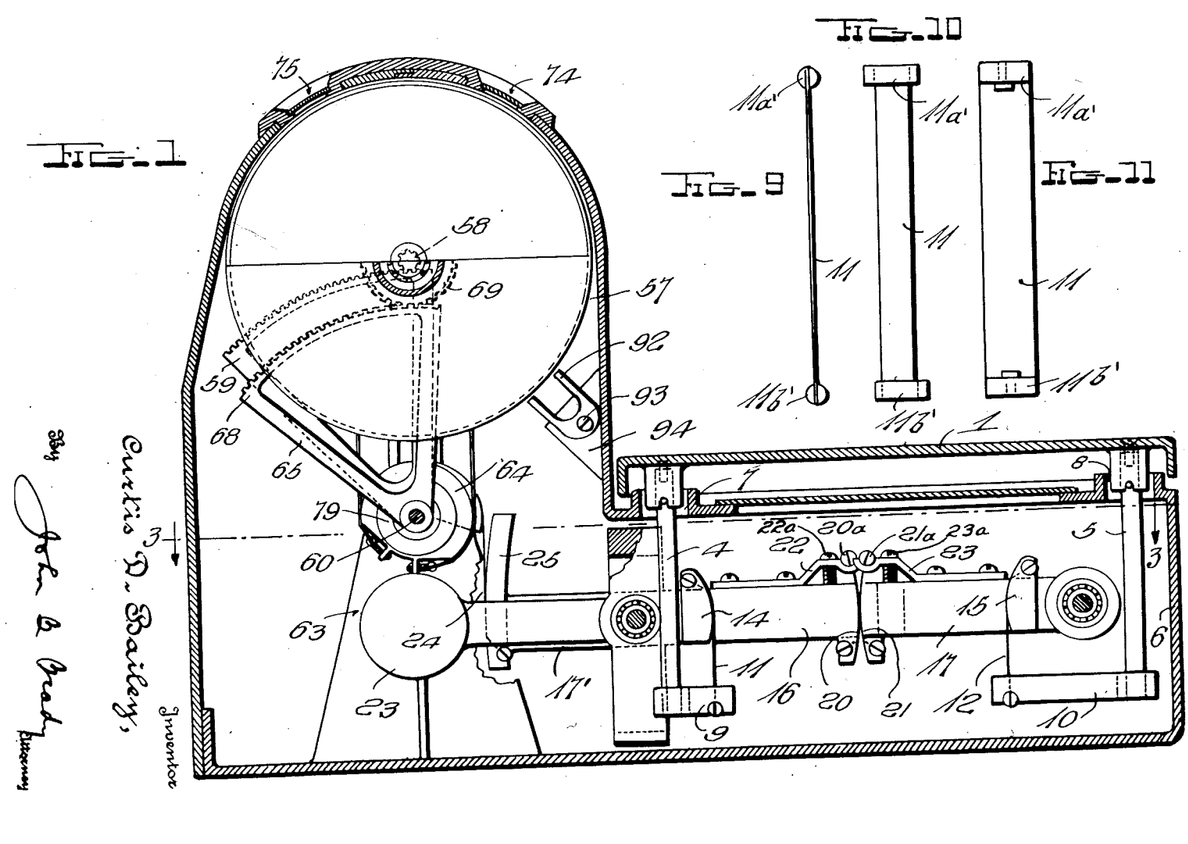
Figure 1 is a longitudinal vertical sectional view taken through the computing scale of my invention on substantially line 1—1 of Fig. 2.
Fig. 9 is a side or edge view of one of the suspension tapes used in the weighing mechanism of my invention.
Fig. 10 is a front elevational view of the suspension tape shown in Fig. 9.
Fig. 11 represents one of the methods for establishing connection with the ends of one of the suspension tapes used in the weighing mechanism of my invention.

The scale beams 16 and 17 are interconnected by steel ribbons 20 and 21 which are similar to the ribbons 11 as illustrated in Figs. 9–11. The steel ribbons 20 and 21 have their upper cylindrical end portions 20a and 21a supported in adjustable brackets 22 and 23 carried by the scale beams 16 and 17 respectively and adjustable under control of adjustable screw 22a and 23a.

In Fig. 1, tape 20 is connected at the bottom of beam 16 and at the top rests in bracket 23 of beam 17. On the far side, tape 21 is connected at the bottom of beam 17 and rests in bracket 22 of beam 16 at the top. This cross connecting is done so that any sudden application of a load on the scale platform will not allow any slack to come in the steel connecting tapes which might subject them to breaking.

The scale beams 16 and 17 are so interconnected that a single counter-weight 95 on a single beam is sufficient to establish static balance in both beams. The ratio of the beam system is 8 to 1 so that a live load of thirty pounds produces a maximum pull on the steel tape connecting the beams with the computing and weighing mechanism of 3.75 pounds.

A steel tape 24 connecting the scale beams to the computing mechanism is fastened at the bottom end to the scale beam arm 17' of scale beam 17, and lies in contact with the circular end 25 of the beam, this circular arc being struck by a sixteen-inch radius, sixteen inches being the distance from the arc to the center of rotation of this beam.

Figures 16, 17, 19:
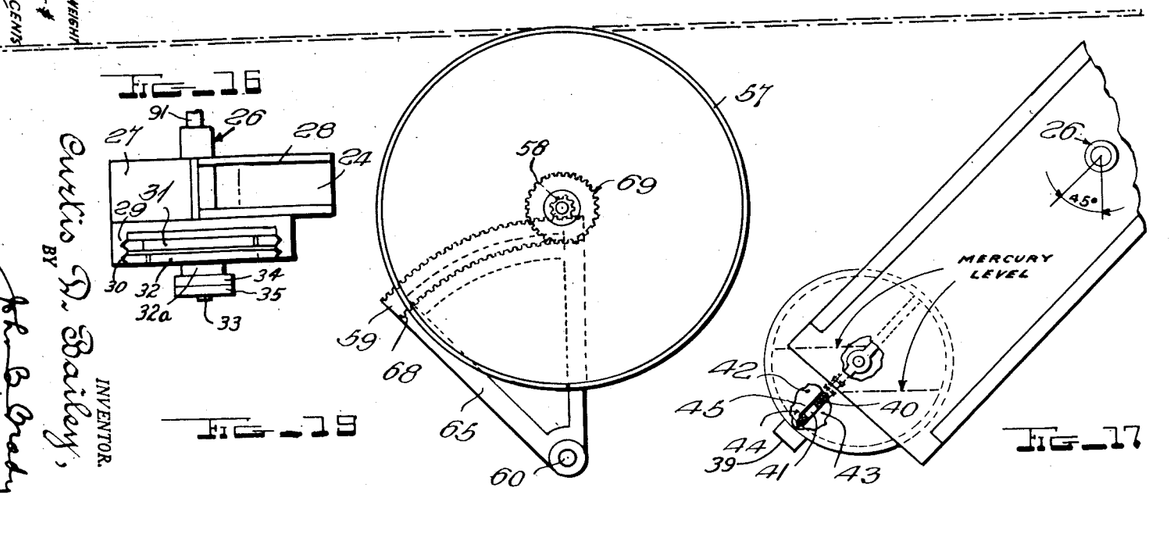
Fig. 16 is a top plan view of the adjustable slide and counter-weight shown in Figs. 13–15.
Fig. 17 is a fragmentary view of the adjustable slide and counter-weight of Figs. 13–16 when moved to an angular adjusting position.
Fig. 19 is a schematic side view of the coacting drums and separate actuators therefor as used in the computing scale and showing the manner in which the separate customer's scale and operator's scale wrap around the coacting drums.

The pull of this tape 24 is taken by a balanced slide housing 27 shown in Figs. 14–17 mounted on a hollow shaft 26, the tape 24 curving about a cam 28 cut into the housing 27, the curve of which is developed from the following relationship:

This slide housing 27 is symmetrical about the vertical centerline and carries in sets of aligned V-grooves 29 and 30, as shown in Fig. 16, two slides 31 and 32, the topmost of which carries a pin 33 on which is mounted two ball bearings 34 and 35, the lower slide 31 serving to maintain the center of gravity at the center of rotation by moving equally and oppositely to slide 32. These slides 31 and 32 move in opposite directions and are driven by a common spur gear 36 which is actuated by the control knob 49 carrying the price-per-pound dial 47. The slide 32 which carries the driving pin 33 through the interposition of the bracket member 32a which pin carries the bearings 34 and 35, can be positioned so that the pin 33 is concentric with the axis of rotation as represented in Fig. 13 or adjusted to any position up to five inches away, in the particular example illustrated, from the center of rotation, the center of gravity of the housing 27 being maintained at the center of rotation.

Near the bottom of the slide housing 27 on a five inch radius, in the particular example illustrated, is mounted a mercury bob or poise weight 37. In the particular example illustrated this poise weight has a total weight of two pounds. The poise weight has two functions. First, it is the weight that automatically balances the live load of thirty pounds plus the weight of the scale platform as a vernier adjustment in addition to the counterweight effect provided by counterweight 95. It is to be noted that it is mounted, in Fig. 13, five degrees to the left of the vertical centerline of housing 27. If the scale platform weighs 3⅓ pounds, this bob 37 will take a position five degrees to the left of the centerline as shown. The design is such that a thirty pound live load will deflect the mercury bob 37 an additional 45 degrees.

If a number of points be taken on the arc swept through by the center of the bob 37, say five degrees apart, or ten points in all, and the live load plus the weight of the scale platform be divided into ten equal parts of 3⅓ pounds each, then the bob weight (two pounds) times five inches times the sin. of the angle equals, in inch pounds, the load equated to the same angle, times ⅛ (the ratio of the scale beams) times the distance from the center of the cam to the point of tangency of the steel tape with the cam, in inch pounds. In general, if 33⅓ pounds = Total weight capacity.

50° = Angular extent of movement and of the cam.

$x$ = Number of points plotted.

8 to 1 = Ratio of scale beams.

$y$ = Radius of cam at point $\frac{50}{x}$

Then, $$\left(\operatorname{Sin.}\left(\frac{50°}{x}\right) \times \text{radius } 5'' \times 2 \text{ pounds}\right) \text{ inch pounds} =$$

$(y \times 33\tfrac{1}{3} \times \tfrac{1}{8})$ inch pounds

If the calibrated drums 56, 66, 67 and 57 are actuated by proper spur gearing, they will move circumferentially directly proportional to the load applied to the scale platform.

The mercury bob 37 is in the form of a cylindrical casing made from iron or steel and forming a container for a pool of mercury indicated at 38 in Figs. 13, 14 and 17. Iron or steel is employed as this metal will not amalgamate with the mercury. A small weight 39 is added to the exterior of the casing at the extreme bottom. This is done for the following reasons: As shown in the drawings Figs. 14–17, the mercury bob 37 is displaced five degrees to the left. This is to balance the dead load of the scale platform. In this position the iron or steel baffle 40 within the casing of bob 37 lies directly on the vertical center line of the casing of bob 37. The iron or steel baffle 40 within the casing of bob 37 contains an aperture 41 through which mercury may pass from one compartment 42 to the other compartment 43 on opposite sides of the thin walled baffle 40 depending upon the angular displacement of the bob 37. The aperture 41 in baffle 40 is covered by a reed valve 44. The reed valve 44 has a small escape hole 45 therein concentric with the aperture 41. This construction allows a rapid transfer of mercury from the right-hand compartment 43 to the left-hand compartment 42 through the aperture 41 with the reed valve 44 angularly displaced therefrom to uncover aperture 41 and a retarded flow of mercury through escape hole 45 in reed valve 44 in the opposite direction from compartment 42 to compartment 43. In balanced position the baffle 40 lies directly on the vertical center line of the bob 37 and there is as much mercury in one compartment 42 as there is in the other compartment 43. Now, if a live load displaces the bob to the left, the mercury will shift so as to preserve its center of gravity in the vertical center line. There will now be more mercury on the right of the center line than on the left because the displacement of the mercury by the baffle is wholly on the left and as the specific gravity of mercury is nearly double that of the material of the baffle, which is iron, there will be an unbalance which is corrected by the addition of a weight 39 which produces a turning moment tending to restore the bob to a vertical position.

It was mentioned above that the mercury weight or bob 37 had two functions. The second of these will now be discussed.

It is observed that there are many friction points in the scale, as in the bearings and gear teeth contacts, and while by precise manufacture friction can be reduced to a very low value, there would still exist under operating conditions an amount which might render the scale impractical because of inaccuracy if a method were not found to nullify the remaining effects of friction.

When a weight is placed on the scale platform the tendency is for the mechanism to establish equilibrium with the load. In doing this, due to inertia, the system goes into a series of diminishing oscillations until finally it is at rest. If there is sufficient friction the system may come to rest an appreciable distance (as shown on the drums) before or after the point of true equilibrium is reached. This would be governed by chance alone. If the point of true balance could be reached from one direction alone then a small additional weight, just overcoming the friction forces, could be permanently added to the scale platform to bring the scale to a true balance. This is the second function of the mercury bob 37. The metal case of the bob 37 is symmetrical and has its center of gravity at its geometric center except in a particular to be noted later. The case is filled with mercury to one-half its capacity, the total weight being two pounds.

If a full capacity weight is placed on the scale platform, the bob 37 would take a position somewhat below that shown in Fig. 17 because the center of gravity of the bob 37 lies to the left of the vertical center line of the bob, and will not reach its position of fifty degrees to the left of the vertical center line passing through the center of oscillation until the mercury has assumed a common level in both chambers. Normally, the oscillations would occur on both sides of the fifty degree position, but with the mercury trapped for a few moments in the left-hand compartment 42, thus having the effect of a heavier bob, the oscillations occur and are damped out at a point below the fifty degree position and the point of true balance is reached only after the mercury has reached a common level. The friction which might have prevented the system from reaching the point of exact balance is overcome by this small additional weight effect of 37 permanently acting on the scale platform.

Figures 2, 4, 5, 6:
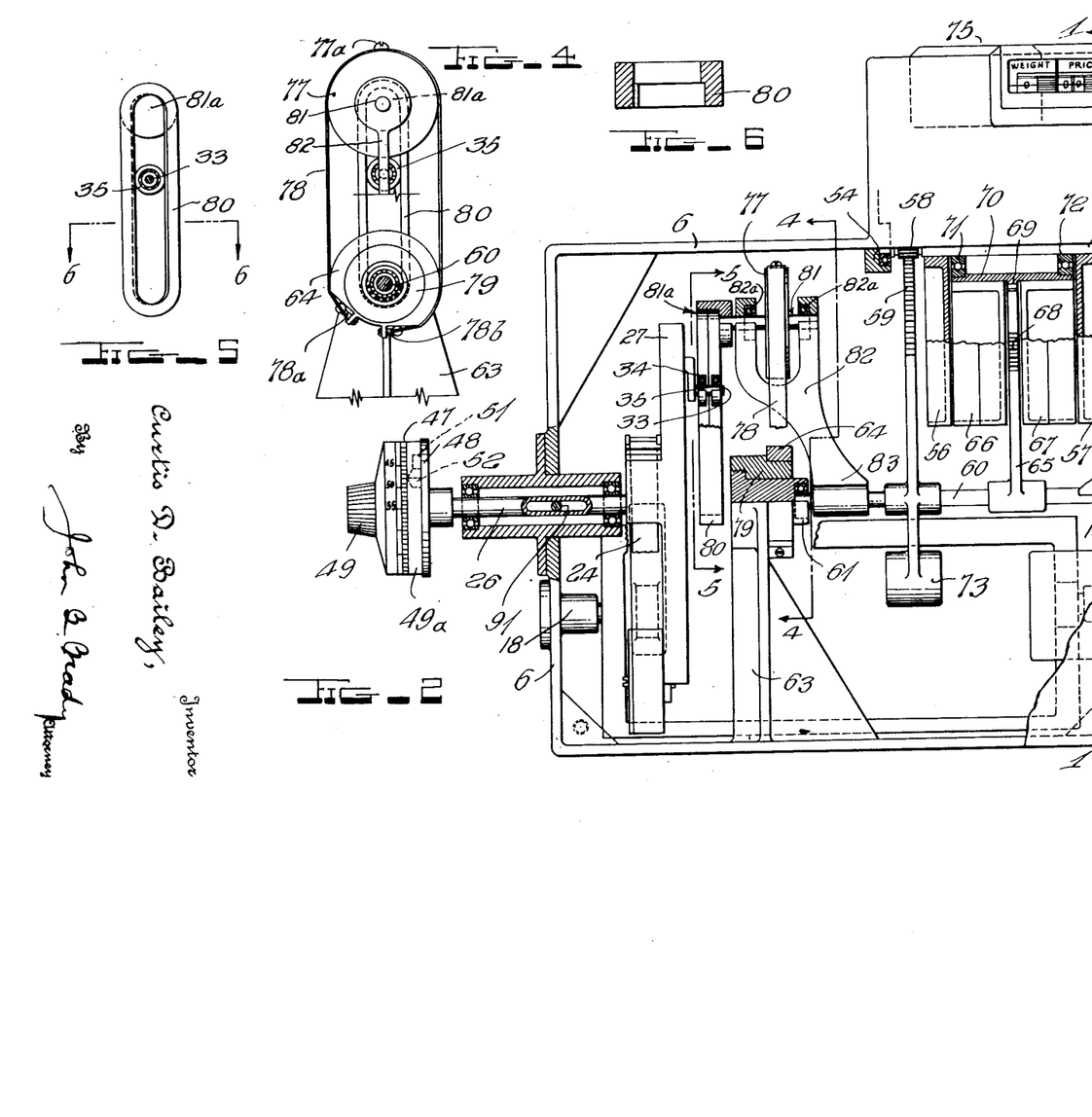
Fig. 2 is a transverse vertical sectional view taken through the computing scale of my invention.
Fig. 4 is a fragmentary vertical sectional view taken substantially on line 4—4 of Fig. 2.
Fig. 5 is a fragmentary sectional view taken substantially on line 5—5 of Fig. 2.
Fig. 6 is a fragmentary sectional view taken substantially on line 6—6 of Fig. 5.
Figure 2:
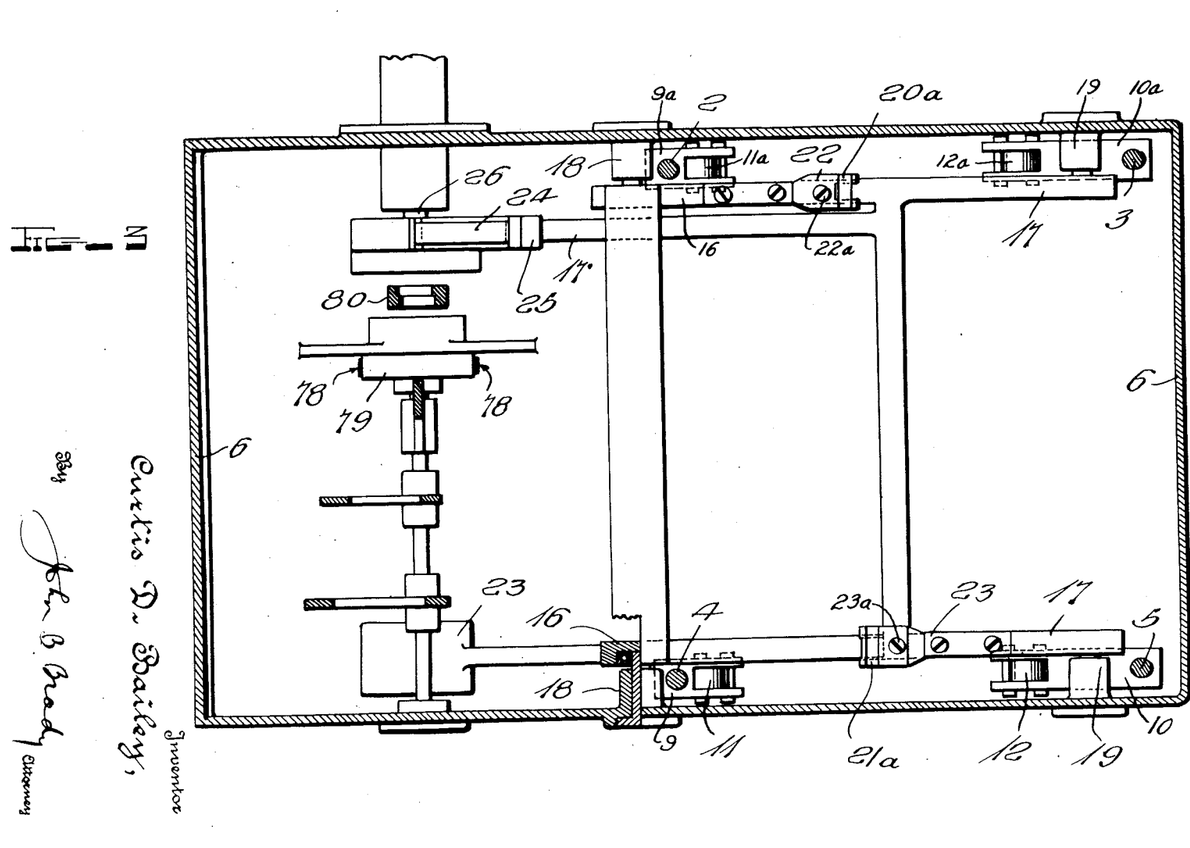
Figures 2, 4, 5:
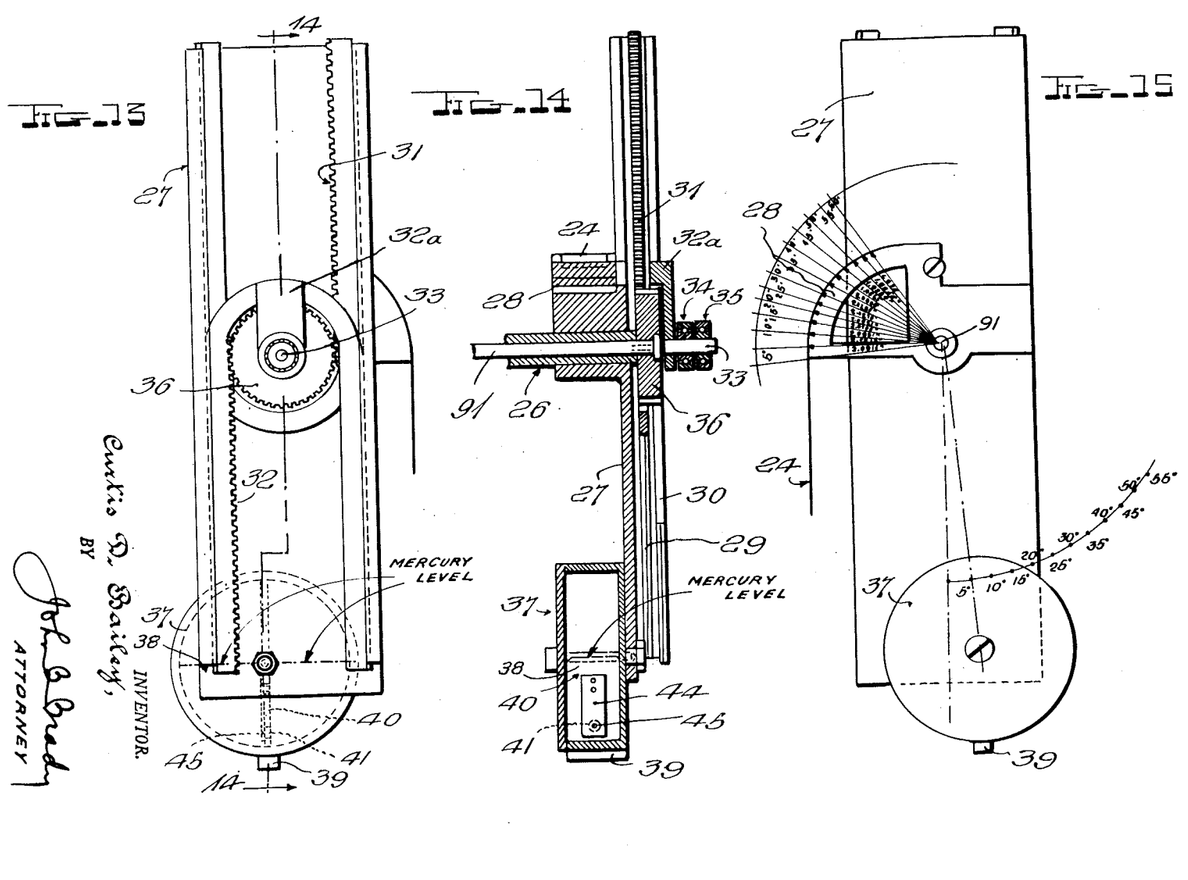
Figures 20, 21:
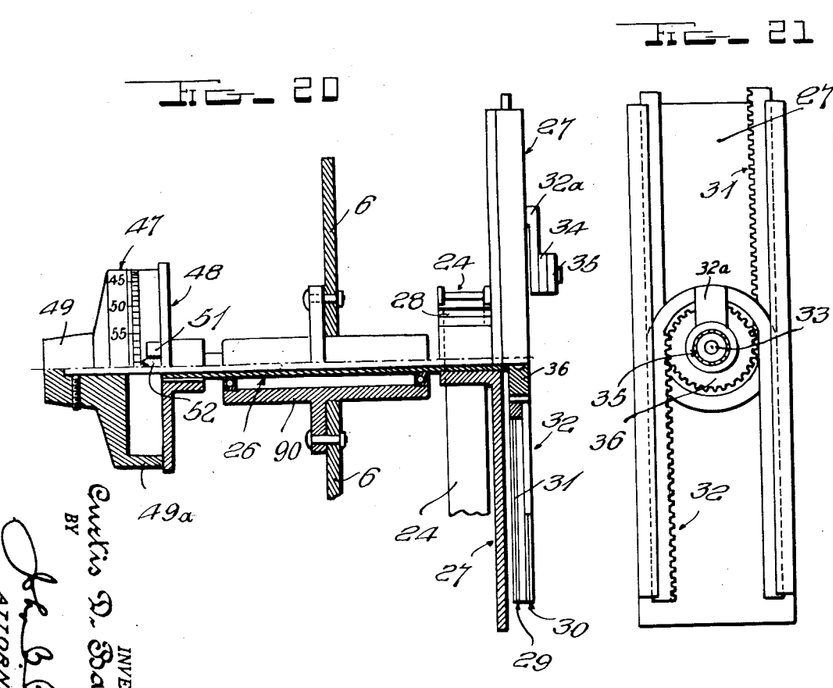
Fig. 20 is an enlarged fragmentary sectional view of the adjusting mechanism for the computing scale.
Fig. 21 is an elevational view of the gearing employed in the adjustable slide mechanism.
Figures 22, 23, 24, 25:
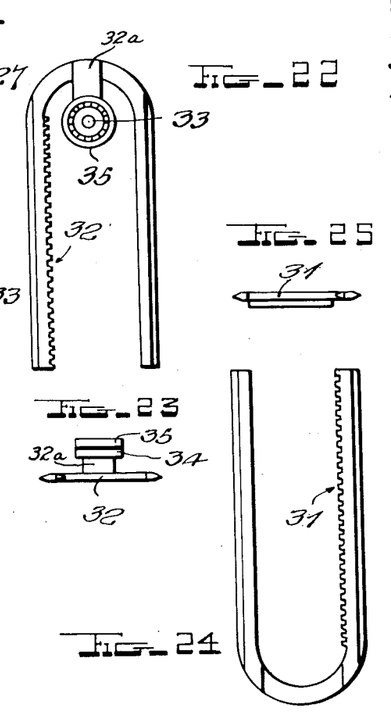
Fig. 22 is an elevational view of one of the coacting slides removed from the mechanism of Fig. 21.
Fig. 23 is a plan view of the slide shown in Fig. 22.
Fig. 24 is an elevational view of the other coacting slide employed in the mechanism of Fig. 21.
Fig. 25 is a plan view of the slide shown in Fig. 24.

The price-per-pound scale 47 is carried by a drum 49a integral with knob 49. This drum 49a also carries the small rectangular raised boss 51 which acts as an abutment stop for the pointer 52 which is integral with plate 48 adjacent the drum 49a. Referring to Figs. 2 and 20 this whole assembly is mounted in ball bearings in a flanged, cylindrical bearing housing 90 bolted to housing 6. This assembly consists of a hollow shaft 26 on the right hand end of which is rigidly mounted slide housing 27, and on the left hand end is rigidly mounted plate 48 with integral pointer 52 associated with drum assembly 49a. Inside of hollow shaft 26 there is a solid shaft 91, on the right hand end of which is rigidly mounted spur gear 36, and on the left hand end of which is mounted the knob 49 integral with the drum 49a carrying scale 47 and the small rectangular raised boss or stop 51. Knob 49 with drum 49a may be rotated to manually revolve shaft 91 within limits determined by the contacting relation of boss or stop 51 with the pointer 52 on plate 48 as a motion transmitting clutch.

Looking at the slide housing 27, in Fig. 2, tape 24 can be seen, broken away, connecting the circular end of scale beam 17' (Fig. 3) with the cam at the back of slide housing 27 (Fig. 15).

A load on the scale platform, through this tape 24, produces a torque on shaft 26. Without the mercury bob attached, this whole assembly is in balance and would remain so in any position it was placed regardless of the position of slide 32, because, through the turning of dial 47—49 and the small solid shaft 91 and spur gear 36 (Fig. 13), slide 32 is forced radially outward and its companion slide 31, of the same weight, is forced radially outward by the same gear and at the same rate but in the opposite direction, thus maintaining balance. If the mercury bob of Figs. 13–15 is now considered as added this assembly will act as a pendulum and serve to automatically balance the load on the scale platform.

The scales for providing the exact price readings for predetermined weights of commodities placed on the scale platform 1 are carried by a combination of drums journalled with respect to a central shaft member 53 journalled in bearings 54 and 55 in opposite aligned positions within the scale housing 6. Shaft 53 provides a supporting means for a pair of external drums represented at 56 and 57 which are adapted to be revolved by movement of the gear 58 under control of the sector 59 which is mounted on shaft 60. Shaft 60 is journalled in bearings 61 and 62 with respect to housing 6. Journal 61 is supported by standard 63 interiorly of casing 6.

In Fig. 2, disc 77 is rigidly mounted on shaft 81 which moves in bearings 82a set in the sides of yoke-shaped arm 82. In Fig. 4, tape 78 is held tight to drum 77 by means of a screw 77a seen at the extreme top. This tape is adjustably fastened at the bottom to a ring 64 at 78a—78b, ring 64 being shown in cross section in Fig. 2. This ring 64 is pressed on a boss 79 on bearing pedestal 63. Shaft 60 revolves and moves both sector 59 and sector 65. Sector 65 extends between the inner drums 66 and 67 and is provided with peripheral teeth 68 which mesh with a circular rack 69 carried by the cylindrical drum support 70. Cylindrical drum support 70 provides a mounting means for the inner drums 66 and 67 and is free to revolve about shaft 53 on bearings 71 and 72. Thus, movement is imparted to both the inner drums 66 and 67 and the outer drums 56 and 57. A suitable counter-weight 73 is applied to an extension of sector 59 for precisely counterbalancing the movement of the parts associated with sector 59 and shaft 60. The graduations of the scale for drums 57 and 67 and drums 56 and 66 are shown more clearly in Fig. 18 from which it will be observed that there are three coacting graduated scales reading "weight", "$" and "¢" on the "Operator's Side" and "weight", "$" and "¢" on the "Customer's Side." There are two viewing apertures for the scales, that is, an operator's aperture represented at 74 and a customer's aperture represented at 75 through which the scales may be observed.

If the gear 36 on the price-per-pound dial shaft 26 is 1¾ inch pitch diameter, turning the dial through 10/11 of a revolution (327° 18′) will extend the slide 27 carrying the driving pin 33 through a distance of five inches. If this 10/11 of the dial circumference is divided into sixty equal spaces each representing one cent, and further subdivided as necessary, then the remaining 1/11 of the perimeter can be used for the stop and index pointer.

The sole purpose of drum 49a, Fig. 2, is to provide an index mark or pointer in definite fixed relationship to the slide housing 27, so that as dial 47—49 is turned, with respect to the stop 51, from cents up through the scale to 60¢ per pound, slide 32 will move five inches away. It can be seen that with the slide in this position so that bearings 34 and 35 are in the extreme end of track 80 and with a capacity load of 30 pounds on the platform, slide housing 27 will move through 45° and consequently arm 82 will move 45°, and shaft 60 through the gearing produces 4½ revolutions of the outer drums, and ⅘ revolutions of the inner drums, thus totalling up $18.00.

Figures 7, 11, 12:
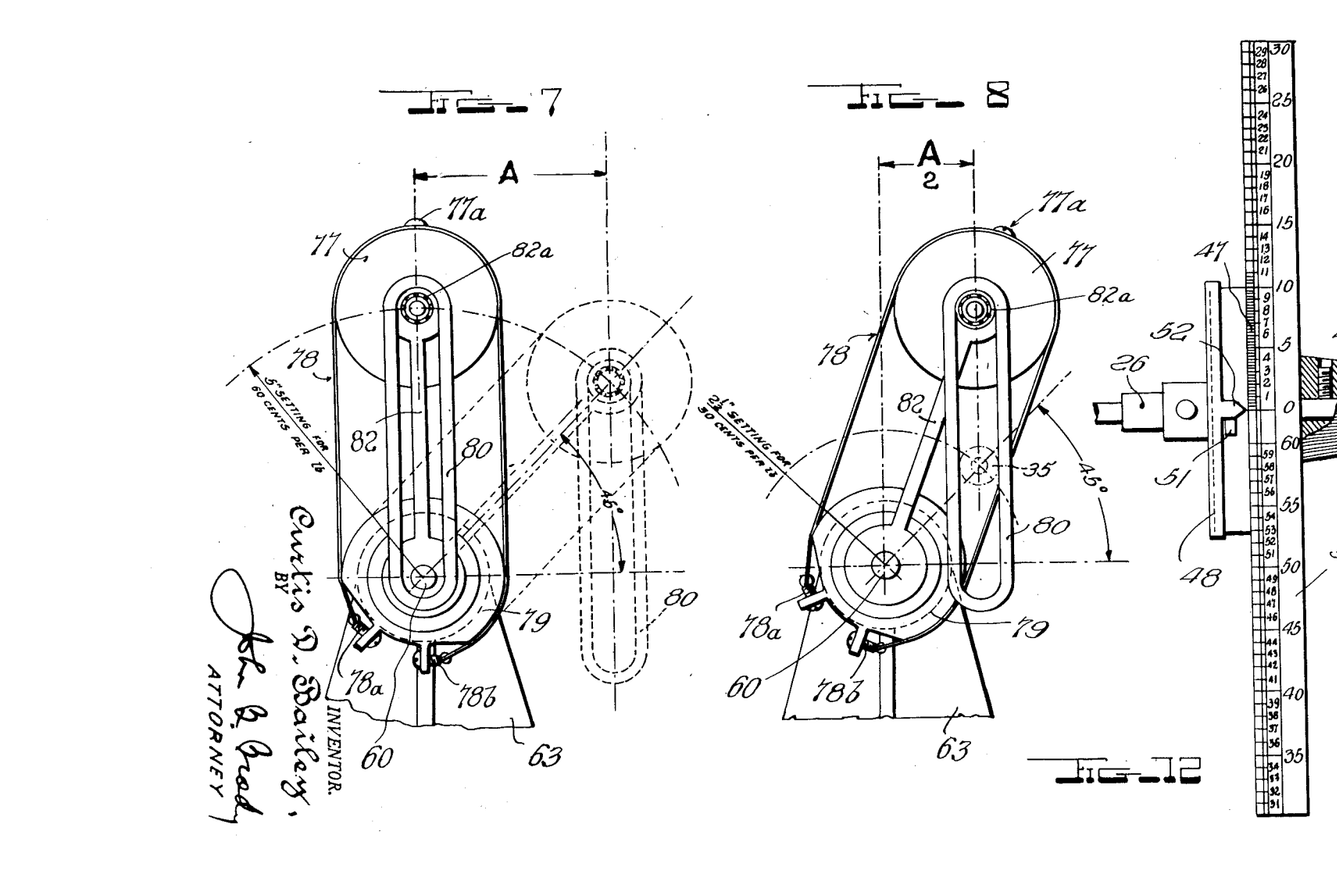
Fig. 7 is a view similar to the view illustrated in Fig. 4, but showing one of the intermediate positions of the adjusting mechanism.
Fig. 12 is an extended view of the price per pound adjustment dial illustrated in assembled view in Fig. 2.

As Fig. 12 shows, when the stop 51 is against the pointer 52, the index mark shows zero, and when the dial is rotated till the stop is again against the point, the index shows sixty cents per pound.

As has been shown before, the angular sweep or orientation of the driving pin 33 is directly proportional to the weight placed on the scale platform. And if the driving pin is fully extended so that it is concentric with the shaft 81 carried in the yoke-shaped end of the driven arm 82, (see Fig. 7) then because of the relative proportions of the several parts the driven arm would also be deflected in proportion to the weight on the platform.

The adjustable interconnection means between the shaft 60 and the driving pin 33 is shown more clearly in Figs. 4–8 inclusive. The driven arm is represented at 82 keyed at 83 on the sector gear shaft 60 which extends radially therefrom. The shaft 81 that is journaled in bearings 82a in the yoke-shaped end of arm 82 has a disc 77 fastened intermediate the sides of the yoke-shaped end of arm 82. This disc 77 is connected through a steel tape 78 to a boss 79 at the side of bracket 63 on which ring 64 is pressed. This ring is made as shown in Fig. 4 with provision for adjusting, by the screws 78a and 78b, the tape 78 which adjusts the position of arm 82. Arm 82 is keyed or pressed on shaft 60 at 83 and with the adjusting tape permits aligning the zeros on all drums with the index mark of the glass window 74. The track 80 which is suspended from cylindrical boss 81a on the end of the shaft 81 extending through disc 77 and which is journalled in yoked arm 82 which swivels at 83 about shaft 60 is always gravitationally maintained in a vertical position. Track 80 is also maintained by the coaction of the parallelogram of forces provided by the disc 77, tape 78 and boss 79. The track 80 is in the form of a loop closed upon itself at each end and hanging vertically downward from boss 81a and embracing the roller bearings 34 and 35 extending from the bracket 32a of slide 32. Track 80 has substantial mass and gravitationally hangs in a vertical position. Thus, as the driving pin 33 of slide 32 is moved to some intermediate point such as represented in Figs 7 and 8, then the angular movement of the driven shaft 60 will be proportional to both the weight and to the distance the driving pin 33 is displaced away from the center of rotation by reason of the displacement of arm 82 under control of the steep tape 78 engaging disc 77.

The total drum movement has been based on a maximum deflection of the mercury bob 37 of 45°. After 45° the balancing effect of the bob 37 against the load becomes increasingly less effective since it varies as the cosine of its angle with the horizontal, and to go beyond 45° would make it necessary to rapidly increase the curvature of the cam 28, so that the point of tangency with the steel tape 24 would more rapidly approach the center of rotation, in order to have straight line readings on the drums.

The maximum weight capacity of the scale in the example illustrated was arbitrarily taken as thirty pounds, and the maximum price-per-pound was taken as sixty cents per pound. The product of these amounts is $18.00, and using a 10″ diameter drum at 56, 66, 67 and 57, and a spacing such that each cent division could be easily read, it was determined that four to five revolutions of the outside drums 56 and 57 would be necessary. Using 45° of a sector gear 59 of 13½″ pitch diameter and 32 D. P. working into a twelve tooth, 32 D. P. pinion 58 cut into the shaft 53 carrying the two outside drums 56—57, 4½ revolutions were obtained.

The circumference of drums 56 and 57 is divided into quadrants, each of which is divided into 100 spaces representing 100 cents and further marked in multiples of 10 cents. The total drum circumference represents $4.00, and this, times 4½ revolutions, gives $18.00 which passes the index window when the scale is loaded with thirty pounds and the price-per-pound dial is at sixty cents per pound. As these 18 drum quadrants, each representing $1.00, pass the index line, they are progressively enumerated on the middle drums 66—67, which has a total movement of ⅘ of a revolution as hereinafter explained. This middle drum cannot have a total movement of more than one revolution in tallying $18.00 since confusion would result in not knowing what part of the $18.00 it represented for any given reading. This inner drum 66—67 is mounted concentric with the outer drums 56—57 and has bearings on the outer drum shaft 53.

Since the outer drum gearing has a fixed center distance, the gears 68—69 driving the inner drums 66—67 must be such that the sum of their pitch radii just equals the fixed center distance of the outer drum gearing. The inner drums 66—67, therefore, are driven by using 45° of a sector gear 68 of 12″ pitch diameter driving into a 32 D. P. rack 69 of sixty teeth and 1⅞″ pitch diameter. For total scale indication this gives the inner drums 66—67 a total movement of ⅘ revolution, or a circumferential travel of 25.133″. This 25.133″ is divided into eighteen equal spaces, each representing one dollar. As each zero mark at the end of each quadrant on the outer drum 56—57 passes the index mark on the glass window 75 in front of the customer, or also at the other side of the scale 74 facing the operator, one of the dollar marks on the inner drum will pass the index mark at the same instant. The ratio of the gearing driving the outer drums and that driving the inner drum is 4½ divided by ⅘ which is 5.625, or a ratio of 5.625 to 1. Therefore, the outer drums 56—57 move circumferentially 5.625 times as fast as the inner drums 66—67.

The values used in explaining this scale are strictly arbitrary, and by using special pitches of gearing and other values to suit, there could be a wide latitude in the physical aspects of this scale. The middle drum carries an additional scale calibrated in pounds and ounces and since 25.133" of this scale passes the index mark upon the application of thirty pounds on the scale platform, and with the slide 27 at the maximum position, this 25.133" is equally divided into thirty spaces representing pounds and further divided into ounces.

When the customer views the customer's window 75 which is inclined 30° towards him, he sees the three scales which can be read only from his side, the other three scales being blocked off from his view. From the operator's side, the operator sees through window 74 which is also inclined 30° towards him. With no load on the scales both customer and operator will see three zeros under the index mark. When a load is placed on the scale platform, the operator will see the digits representing increasing amounts appearing from above, while the customer will see the digits on his scales appearing from below and disappearing upward, because on loading the drums travel in one direction only. The price-per-pound scale allows quick adjustment of the scale for directly providing visual readings of price of the commodity to the customer without the necessity for mental calculation and incidental loss of time in making of purchases. The weight is arrived at only by placing the price-per-pound dial at the maximum position, for example, 60¢ per pound, which position will develop four and one-half revolutions of the cost drums and about four-fifths of a revolution of the weight drums, upon application of 30 lbs. on the scale platform.

The operation of the scale and the physical dimensions are based on three arbitrary values: It should have a capacity to weight 30 lbs.; it should have a unit cost factor from 0 to 60¢ per pound; and it should show the product maximum of $18.00, or the product of 30 lbs. @ 60¢ per pound.

Let it be assumed that all drum readings are straight line, that is, if weights are added to the weighing platform in increments of 5 lbs., the final 5 lbs. added last to produce a 30 lb. reading, will produce exactly the same angular rotation of shaft 60 that the first 5 lbs. placed on the platform will produce.

Figure 18:
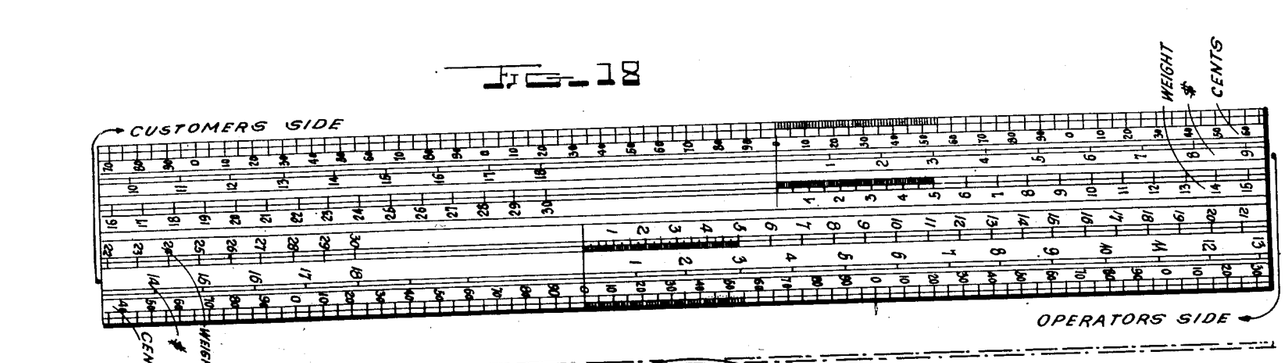
Fig. 18 is an extended view of the graduated scales showing both the scales for the customer's side and the scales for the operator's side of the co-acting drums used in the computing scale of my invention.

In order that intermediate amounts from 0 to $18.00 may be easily read it is necessary to extend the scale length shown in Fig. 18 as far as practicable. Arbitrarily, four and one-half revolutions of a 10" diameter drum was chosen giving an extended length of scale, in effect, of about 141 inches. The drum circumference is calibrated or divided to show $1.00 for each quadrant. If 15 lbs. were on the scale platform and the price-per-pound dial set at 60¢ per pound, the price should read $9.00 total, but will read $1.00 at the end of the first quadrant, and this will show in the window only after two complete revolutions of the cost drums. The operator cannot be expected to note past revolutions, at $4.00 per revolution, and add thus to what he sees in the window. Accordingly, the middle drums are geared so they revolve not more than one revolution for the four and one-half revolutions of the cost drums. Since both drums are driven by the same shaft 60, they bear a fixed ratio to one another through the associated gearing. The weight and dollar drums (center drums) have a maximum travel of about four-fifths revolution. This four-fifths revolution is equivalent to about 25 inches of scale length and divided, adjacent to the cost drum, so that as the end of each quadrant of the cost drum appears in the window, the proper dollar designation appears in the window also, and in line with the quadrant mark. On these center drums are also calibrated scales showing weight.

In order that these weight readings be valid, the price-per-pound dial must be set at 60¢ per pound. This is the only position where the weight drum reaches maximum travel and the calibration is through this maximum range. If the price-per-pound dial is set at any intermediate point, when weighing, the observed weight to the true weight is proportional to the distance of the intermediate setting to the maximum setting of 5 inches away from the zero setting. Thus any weight reading is false unless obtained when the price-per-pound dial is set at 60¢ per pound, or the maximum position.

If $1.00 worth of a commodity is wanted and the unit price is 20¢ per pound, the operator sets the price-per-pound dial at 20¢ and adds the commodity until $1.00 comes into the cost window. If, now, the weight is desired, he sets the cost-per-pound dial to the maximum position, or at 60¢ per pound, and the correct weight of 5 lbs. will appear in the weight window.

As illustrated in Fig. 1 a horseshoe shaped Alnico magnet 92 is fastened by a screw 93 to an extension 94 of casing 6 in a position adjacent the surface of drums 56—57. The drums are formed from magnetic material and the magnet 92 will assist materially in bringing oscillations of the drums and scale thereon to a stop. When the drums move past the pole faces of the magnet 92, eddy currents are set up so as to resist the motion. This resistance drops off as the speed drops and at zero speed there is no current effect whatever.

A summary of the operation of the scale follows.

Suppose a customer asks for $1.00 worth of sugar and the price is 10¢ per pound. This of course is easily figured mentally and could be done by placing the price per pound dial 47—49 at 60¢ per pound thus placing the slide at the highest point in track 80. Since 30 lbs. will turn the slide through 45° and through arm 82, shaft 60, sector gear 65 and gear 69, drums 66 and 67 will move through ⅘ revolution and show 30 lbs. on the weight scale, a mass of 10 lbs. will move the slide through 15° and through the same sequence will move drums 66 and 67 through ⅘ × ⅓ or 4/15 revolution and show 10 pounds in the customer's window 75.

While this example is elementary it illustrates how the scale computes as in cases where the price per pound may be in cents and fractions of a cent. When the knob 49 is turned to 60¢ per pound the slide pin 33 moves out radially five inches away from the center of rotation as represented in Fig. 7. With pin 33 in this position and moved over 45° from the vertical, as it would be with 30 pounds on the scale platform, a horizontal distance A is reached (extreme top of Fig. 7). When distance A is reached it is known that through the gearing the drum has revolved 4½ revolutions, each revolution representing 4 quadrants of $1.00 each, or a total of 18 quadrants or dollars. Let distance $A = 18$ quadrants. From Fig. 8 it will be seen that with the dial brought back to 30¢ per pound, the slide pin 33 is brought to a 2½" radius or ½ the original 5" (but still at 45° from the vertical). The horizontal distance is now $$\frac{A}{2}$$

If the slide is now brought back to 10¢ per pound or ⅙ the original distance of 5" (but still at 45° from the horizontal) the horizontal distance is then $$\frac{A}{6}$$

But 30 pounds will deflect the slide pin 45° and 10 pounds will deflect it 15° or ⅓ as much $$\frac{A}{6} \times \frac{1}{3} = \frac{A}{18}$$

and since $A = 18$ quadrants $$\frac{18 \text{ quadrants}}{18} = 1 \text{ quadrant}$$

or equivalent to $1.00 on the scale drum and this is the product of 10 pounds at 10¢ per pound.

The forces that are set up in the scale when a weight is applied to the platform are briefly as follows:

The weight produces a downward thrust from the platform through posts 2, 3, 4, and 5. While thrust is shown and described as being taken by tapes 11 and 12, fastened to the tops of cams 14 and 15, it will be understod that on the far side the construction is identical and symmetrical to that on the near side, and that four tapes actually transmit the forces as indicated at 11a and 12a. The downward pull of these four tapes through the medium of tapes 20 and 21 produce a concentrated downward pull on tape 24 which, wrapped on cam 28 of the slide housing, tends to produce rotation of slide housing 27 which is mounted on the tubular shaft 26.

If slide 32 is extended at all away from its minimum position of concentricity with the hollow shaft 26, then bearings 34 and 35 will produce a force, on the side of track 80 as shown in Fig. 7. Track 80 moves in a vertical plane and orients shaft 81 and disc 77 fastened to shaft 81. As tape 78 is held at the ends on 77 by a screw 77a it is seen that any force to the right on track 80 will cause disc 77 to produce a tension on the right side of tape 78 or to "wind up" on the right hand side and "pay off" tape on the left hand side.

The result is a turning moment of yoked arm 82 and shaft 60 about their axis since they are keyed together at 83.

The customer and the operator views two coacting scales through the respective customer's window 75 and the operator's window 74, that is, the customer views a weight scale and a cost per pound scale on outer drum 56 and inner drum 66 through window 75, while the operator views a weight scale and a cost per pound scale on outer drum 57 and inner drum 67 through window 74 oriented at different positions on opposite sides of the scale enabling the device to be used on the salescounter with the operator behind the counter and the customer in front of the counter.

The arrangement of mechanism shown secures a high degree of accuracy in weighing and measurement and while I have described my invention in one of its preferred embodiments I realize that modifications may be made and I intend no limitations upon my invention other than may be imposed by the scope of the appended claims.

What I claim as new and desire to secure by Letters Patent of the United States is as follows:

1. A computing scale, comprising an angularly movable shaft, a multiple drum system controlled by said shaft, said multiple drum system carrying graduated indicia thereon calibrated according to weights and monetary values, a scale beam for imparting angular movement to said angularly movable shaft, a load receiving platform for effecting displacement of said scale beam, a pendantly supported auxilary mass, manually controlled settable means for selectively varying the angular disposition of said pendantly supported auxiliary mass, an orientatable connection means between said pendantly supported auxiliary mass and said shaft whereby the effect of said auxiliary mass on said shaft may be controlled, and calibrated adjustment means carried by said first mentioned means and graduated in terms of price-per-pound with reference to the weight and monetary value indicia carried by said multiple drum system.

2. A computing scale, comprising a load receiving platform, a scale beam operated by said platform, a multiple drum system including drums carrying indicia thereon graduated in accordance with weight and monetary values, means for controlling the movement of said system according to the displacement of said scale beam, a pendantly supported and angularly displaceable mass spaced from said drums and connected with said means, a manually operated control member calibrated in accordance with price-per-pound graduations relative to the weight and monetary graduations on said drums, and a variable connection between said control member, said displaceable mass and said drums for proportionally controlling the position of said drums independently of the load applied to said load receiving platform.

3. A computing scale, comprising in combination with an angularly shiftable shaft member, a load receiving platform, a scale beam for imparting movement to said shaft member under control of said load receiving platform, a multiple drum system including drums carrying indicia thereon graduated in terms of weight and monetary values, separate means extending from said shaft member for rotating said drums and orientatable means connected with said separate means for applying an auxiliary force to said shaft member, and a manually operative rotatable control device, connected with said last mentioned means, calibrated in accordance with price-per-pound graduations for selectively setting the positions of said drums.

4. A computing scale, comprising in combination with an angularly shiftable shaft member, a load receiving platform, a scale beam for imparting movement to said shaft member under control of said load receiving platform, a multiple drum system including drums carrying indicia thereon graduated in terms of weight and monetary values, means extending from said shaft member for rotating said drums, and separate means extending from said shaft member for applying an auxiliary force to said shaft member, said last mentioned means including an angularly displaceable pendant weight, a manually operative control member, carrying price-per-pound graduations thereon and a slidable and rotatable connection between said weight and said shaft member, for selectively displacing said weight for adjusting the position of said shaft member.

5. A computing scale, comprising in combination with an angularly shiftable shaft member, a load receiving platform, a scale beam controlled by said load receiving platform, a multiple drum system including drums carrying indicia thereon graduated in terms of weight and monetary values, means extending from said shaft member for rotating said drums, separate means extending from said shaft member for applying an auxiliary rotative force to said shaft member a pendant member adjustably connected with said last mentioned means, said pendant member including a shiftable mass and a manually operated control member for selectively positioning said angularly shiftable mass, said control member being calibrated in terms of price-per-pound with reference to the graduations on said multiple drums.

6. A computing scale, comprising in combination with an angularly shiftable shaft member, a load receiving platform, a scale beam controlled by said load receiving platform, a multiple drum system including drums carrying indicia thereon graduated in terms of weight and monetary values, means extending from said shaft member for rotating said drums, separate means extending from said shaft member for applying an auxiliary force to said shaft member, said last mentioned means including a pivotally suspended pendulum-like member having oppositely adjustable linear slides therein, a manually adjustable control member for adjusting the linear position of said slides, said control member including a calibrated scale graduated in terms of price-per-pound and operative to control the linear position of said pendulum-like member for variably controlling the effective mass thereof upon said shaft member, and an adjustable connection between said pendulum-like member and said shaft member.

7. A computing scale, comprising in combination with an angularly shiftable shaft member, a load receiving platform, a scale beam controlled by said load receiving platform, a multiple drum system including drums carrying indicia thereon graduated in terms of weight and monetary values, means extending from said shaft member for rotating said drums, separate means extending from said shaft member for applying an auxiliary force to said shaft member, a pendulum-like member mounted for movement in a plane adjacent the end of said shaft member and in a plane normal to the axis thereof for linear displacement with respect to a control position, a weighted chamber attached to said pendulum-like member, a pair of adjustable slides mounted in said pendulum-like member, a manually operative control member adjustable in a plane spaced from but parallel to the plane of movement of said pendulum-like member and including a shaft extending through said control position and operative to selectively displace said slides in opposite directions, a scale on said control member having calibrations thereon in terms of price-per-pound relative to the indicia graduations on said drums and a rotatable connection between one of said slides and said angularly shiftable shaft member.

8. A computing scale, comprising in combination with an angularly shiftable shaft member, a load receiving platform, a scale beam controlled by said load receiving platform, a multiple drum system including drums carrying indicia thereon graduated in terms of weight and monetary values, means extending from said shaft member for rotating said drums, separate means extending from said shaft member for applying an auxiliary force to said shaft member, a pendulum-like member pivotally supported adjacent the end of said shaft member, an adjustable connection between said pendulum-like member and said shaft member, said pendulum-like member including a pair of slidable plates therein adjustable in opposite linear directions from the pivotal mounting of said pendulum-like member, a manually controllable adjusting means operating to control the linear position of said slidable plates and carrying a calibrated scale graduated in terms of price-per-pound relative to the weight and monetary indicia graduations on said drums and a counter-balance carried by said pendulum-like member.

9. A computing scale comprising in combination with an angularly shiftable shaft member, a load-receiving platform, a scale beam for imparting movement to said shaft member under control of said load-receiving platform, a multiple drum system including drums carrying indicia thereon graduated in terms of weight and monetary values, means operated by said shaft member for rotating said drums, angularly displaceable independent means for applying an auxiliary force to said shaft member, a rotatably journalled manually operative control shaft, a calibrated dial carried by said control shaft and graduated in terms of price-per-pound relative to the weight and monetary values of the indicia graduations on said drums, a pendulum-like member connected with said control shaft, and a connecting device between said pendulum-like member and said angularly displaceable independent means comprising an elongated closed loop having the effective interconnecting length thereof determined by the manual setting of said rotatably journalled control shaft, and adjustable means between said elongated closed loop and said angularly displaceable independent means.

References Cited in the file of this patent
UNITED STATES PATENTS

| Number | Name | Date |
|---|---|---|
| 1,835,903 | Rouleau | Dec. 8, 1931 |